Figure 1:
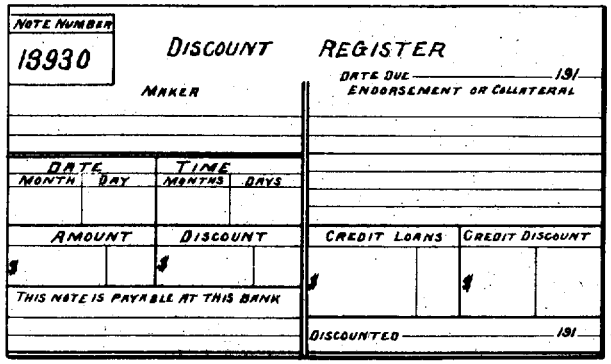

M. J. PHILBIN.

NOTE RECORD CARD SET.

APPLICATION FILED AUG. 4, 1916.

Reissued Sept. 3, 1918.

14,518.

2 SHEETS—SHEET 1.

WITNESSES:
H. Kurst.

INVENTOR
Matthew J. Philbin
BY Howard P. Denison
ATTORNEY.

M. J. PHILBIN.

NOTE RECORD CARD SET.

APPLICATION FILED AUG. 4, 1916.

Reissued Sept. 3, 1918.

14,518.

2 SHEETS—SHEET 2.

WITNESSES:
H. L. Hurst.

INVENTOR
Matthew J. Philbin
BY Howard P. Denison
ATTORNEY

UNITED STATES PATENT OFFICE.

MATTHEW J. PHILBIN, OF OLYPHANT, PENNSYLVANIA.

NOTE-RECORD-CARD SET.

14,518. Specification of Reissued Letters Patent. Reissued Sept. 3, 1918.

Original No. 1,189,286, dated July 4, 1916, Serial No. 5,475, filed February 1, 1915. Application for reissue filed August 4, 1916. Serial No. 113,182.

*To all whom it may concern:*

Be it known that I, MATTHEW J. PHILBIN, a citizen of the United States of America, and resident of Olyphant, in the county of Lackawanna and State of Pennsylvania, have invented new and useful Improvements in Note-Record-Card Sets, of which the following, taken in connection with the accompanying drawings, is a full, clear, and exact description.

This invention relates to an improved note record card set for use in banks and other places where it is necessary or desirable to keep a record of all current notes, and information pertaining thereto, held by or passing through such bank or similar institution.

Under the present system, these records are usually kept in bound or loose-leaf ledgers, in which it is necessary to make successive entries in the "discount register", the "discount tickler", the record under "endorser" and another record under the "maker" of the note, after which a "note notice" is made out from the note and finally a record is made out to run through the work of the bank, thus necessitating six entries in order to record the information necessary for each note, which is obviously laborious, cumbersome and inconvenient as a reference.

The main object of my present invention is to provide a ready reference card index for bank notes in which all of the information or records of any bank note may be entered at one writing and the cards filed under their respective captions or headings to constitute a convenient and ready reference for subsequent use.

In other words, I have sought to provide what might be termed a "liability card ledger" in which the cards of each set for a particular note bear the same number and record, but are filed under their proper headings and constitute a current record that is positively accurate without additional labor except as to the filing of the cards alphabetically.

In the drawings—

Figures 1, 2, 3, 4 and 5 are face views of a set of cards bearing the data or information for a single note designated by a serial number, in this instance 13930, printed in the upper left-hand corner under the caption "note number".

The card shown in Fig. 1 under the heading "discount register" is a part of the original record of entry detached from a continuous sheet bearing a series of, in this instance five, similar records under consecutive numbers which are adapted to be bound with similar sheets and used in the same manner as the bound book "discount register" is used.

This card bears upon its face the heading "discount register" together with the "date due" and the "endorsement or collateral", and also the "note number".

Upon one-half of the face of the card is recorded the "maker", "date, month and day", "time, months and days", "amount", "discount" and the bank at which the note is payable under the heading "This note is payable at this bank".

On the opposite half of the face of the card is recorded the "date due", "endorsement or collateral", "credit loans", "credit discount", and the "date discounted".

Figure 2:
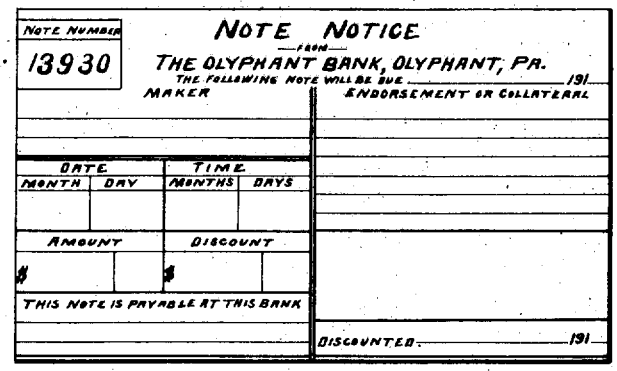
Figure 3:
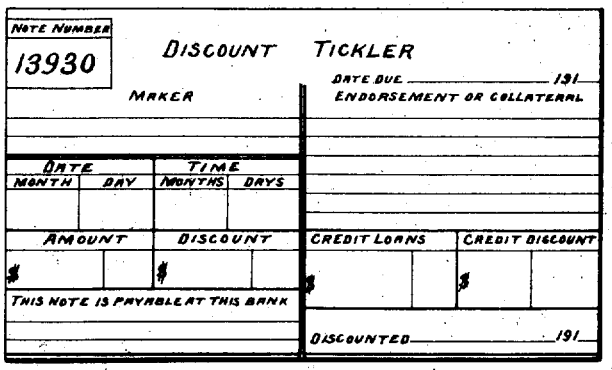
Figure 4:
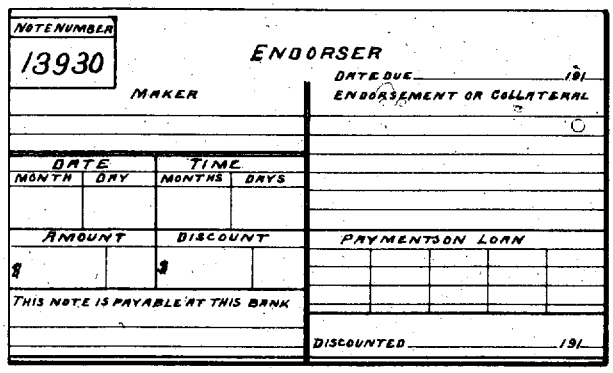
Figure 5:
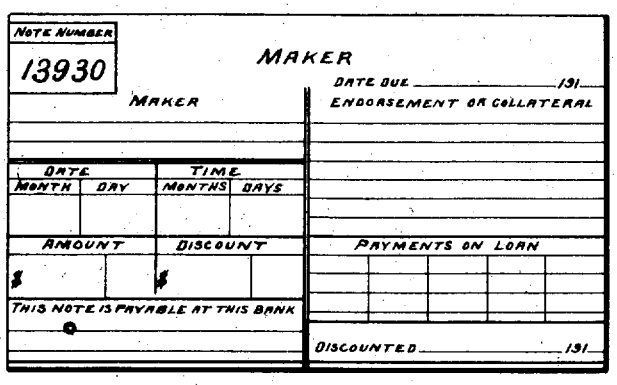

The cards shown in Figs. 2, 3, 4 and 5 bear, rspectively, the captions "note notice", "discount tickler", "endorser" and "maker", but otherwise bear the same information as recorded upon the card shown in Fig. 1, except that in Fig. 2 the "credit loans" and "credit discounts" are omitted and a blank space left for instructions to the "maker" or "endorser", the only difference in the cards shown in Figs. 4 and 5, aside from the captions or headings, being that the space occupied by "credit loans" and "credit discount" in the "discount register" card of Fig. 1 is substituted by "payments on loan".

The card shown in Fig. 2 is a notice to the maker of the note and is filed in a suitable drawer according to the maturity of the note. A week or ten days before maturity, this notice is sent to the maker of the note to afford ample time for its attention, the detail information being given on the notice to avoid any confustion as to which note is intended, in case the maker has more than one note discounted.

The card shown in Fig. 3 and designated as the "discount tickler" is filed according to the maturity of the note and on the due date is run through the work of the bank and gives to the note clerk all the necessary information without further labor.

The card shown in Fig. 4 and marked "endorser" is filed under the name of endorser in the liability file.

The card shown in Fig. 5 is a final record of the series and is filed in the liability file under the name of the maker.

It is now apparent that all the note record sheets bear the same number and have the same record, but are filed under their proper headings, thus constituting a liability ledger which is kept current and is positively accurate without additional labor, except as to the filing of the card records in alphabetical arrangement.

The saving of time by this system of cards is obvious since all entries are made with one writing when the cards are superposed and separated by carbon sheets, it being noted that the empty spaces, or spaces containing different subject-matter, of each card lie directly over the other, while with the bound or loose-leaf ledgers now in common use, it is necessary to make the entries in the "discount register", "discount tickler", the record under "endorser", the record under the "maker" of the note, and afterward the "note notice" and finally the record which is made out to run through the work of the bank, thus necessitating six entries as against the one entry necessary in applicant's system, and while I have chosen to place such notations upon the cards as "discount register", "tickler", "endorser", "maker" and "notice", other and equivalent indicating designations may be used and various and equivalent notations may be substituted for any or all of the notations upon the cards, and although I have shown specific relative arrangements as constituting the preferred form of my invention, I do not desire to limit myself to the same, as many and various changes may be made within the scope of the invention as set forth in the claims, and although I have disclosed five (5) record cards as constituting the preferred record set, it will be readily understood that the bank record is complete without the card designated as "note notice", the same being for the convenience of the bank in notifying the maker of the note that the same is due, as shown by the other cards of the set contained in the bank records, and the said "note notice" card may be omitted from the set without departing from the scope of the invention as set forth in the claims, and it will further be apparent that the order in which the cards are herein shown and described is not essential and may be modified and varied as desired, and that the designating terms herein described may be replaced by other terms of equivalent or like meaning, as, for instance, the word interest may be substituted for discount wherever desired, as for use in trust companies as distinguished from banks, all without departing from the spirit of this invention as set forth in the appended claims.

What I claim is:

1. A note record card set having cards designated respectively as a register card, a tickler card, an endorser card, and a maker card, each of said cards provided with spaces designated to receive the name of the maker and the endorser and the due date of a note, each said space on one card being over the corresponding space on succeeding cards for the interposition of a transfer medium thus providing: 1st, a sheet to be filed away as an original record; 2nd, a tickler record to be filed away according to due date; 3rd, an endorser record; and, 4th, a maker record, the endorser record and the maker record to be filed alphabetically in accordance with the endorser's and maker's names, respectively.

2. A note record card set having cards designated respectively as a register card, a tickler card, an endorser card, and a maker card, each of said cards provided with spaces designated to receive the name of the maker and the endorser, the due date, the time, the amount, and the date of a note, each said space on one card being over the corresponding space on succeeding cards for the interposition of a transfer medium thus providing: 1st, a sheet to be filed away as an original record; 2nd, a tickler record to be filed away according to due date; 3rd, an endorser record; and, 4th, a maker record, the endorser record and the maker record to be filed alphabetically in accordance with the endorser's and maker's names, respectively.

3. A note record card set having cards designated respectively as a register card, a tickler card, an endorser card, and a maker card, each of said cards provided with spaces designated to receive the name of the maker and the endorser, the due date, the time, the amount, the discount, the date and number of a note, each said space on one card being over the corresponding space on succeeding cards for the interposition of a transfer medium thus providing: 1st, a sheet to be filed away as an original record; 2nd, a tickler record to be filed away according to due date; 3rd, an endorser record; and, 4th, a maker record, the endorser record and the maker record to be filed alphabetically in accordance with the endorser's and maker's names, respectively.

4. A note record card set having cards designated respectively as a register card, a tickler card, an endorser card, and a maker card, each of said cards provided with spaces designated to receive the name of the maker and the endorser, the due date, the time, the amount, the discount, and the date of a note, each said space on one card being over the corresponding space on succeeding cards for the interposition of a transfer medium thus providing: 1st, a sheet to be filed away as an original record; 2nd, a tickler record to be filed away according to due date; 3rd, an endorser record, and, 4th, a maker record, the endorser record and the maker record to be filed alphabetically in accordance with the endorser's and maker's names, respectively, the tickler card provided with spaces designated to receive credit loans and credit discounts.

5. A note record card set having cards, respectively, designated as a register card, a notice card, a tickler card, an endorser card and a maker card, all of substantially the same size and adapted to be separably superposed one upon the other for the interposition of transfer medium, each card having spaces appropriately designated, respectively, as a maker's name space, a note date space, a time space and an amount space, said spaces being so arranged that like spaces will be in exact superposition when the cards are superposed one upon the other, whereby the matter impressed on the said spaces of the front card may be produced in the corresponding spaces of the other cards at one writing, the discount register and discount tickler cards provided with additional spaces appropriately designated for entry of credit loans and credit discounts, such spaces being in registration when the cards are superposed, whereby credit loan and credit discount matter may be produced at one writing upon the discount register and discount tickler cards when said cards are separated from the remaining cards.

6. A note record card set having cards respectively designated as a register card, a notice card, a tickler card, an endorser card and a maker card, all of substantially the same size and adapted to be separably superposed one upon the other for the interposition of transfer medium, each card having spaces appropriately designated, respectively, as a maker's name space, a note date space, a time space and an amount space, said spaces being so arranged that like spaces will be in exact superposition when the cards are superposed one upon the other, whereby the matter impressed on the said spaces of the front card may be produced in the corresponding spaces of the other cards at one writing, the discount register and discount tickler cards provided with additional spaces appropriately designated for entry of credit loans and credit discounts, such spaces being in registration when the cards are superposed, whereby credit loan and credit discount matter may be produced at one writing upon the discount register and discount tickler cards when said cards are separated from the remaining cards, and the endorser and maker cards provided with spaces appropriately designated for receiving indications of payments on the loan, said spaces being in registration when the cards are superposed so that matter relating to payments on the loan may be produced on said endorser and maker cards at one writing when said cards are separated from the remaining cards.

MATTHEW J. PHILBIN.

In the presence of—
DAN. G. JONES,
WALTER TINSLEY.